US011636982B2

(12) United States Patent
Kanzaki et al.

(10) Patent No.: US 11,636,982 B2
(45) Date of Patent: Apr. 25, 2023

(54) MULTILAYER CERAMIC ELECTRONIC COMPONENT INCLUDING MULTILAYER EXTERNAL ELECTRODES

(71) Applicant: Murata Manufacturing Co., Ltd., Nagaokakyo (JP)

(72) Inventors: Taisuke Kanzaki, Nagaokakyo (JP); Kosuke Onishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 26 days.

(21) Appl. No.: 17/205,067

(22) Filed: Mar. 18, 2021

(65) Prior Publication Data
US 2021/0327648 A1    Oct. 21, 2021

(30) Foreign Application Priority Data

Apr. 20, 2020    (JP) .............................. JP2020-074502

(51) Int. Cl.
*H01G 4/30*    (2006.01)
*H01G 4/008*    (2006.01)
(Continued)

(52) U.S. Cl.
CPC ............... *H01G 4/30* (2013.01); *H01G 4/008* (2013.01); *H01G 4/012* (2013.01);
(Continued)

(58) Field of Classification Search
CPC .......... H01G 4/30; H01G 4/008; H01G 4/012; H01G 4/0085
See application file for complete search history.

(56) References Cited

U.S. PATENT DOCUMENTS

2008/0081200 A1*  4/2008 Katsube ................... H01G 4/30
                                                                427/404
2011/0290542 A1* 12/2011 Nishisaka ............. H01L 41/083
                                                                174/257
(Continued)

FOREIGN PATENT DOCUMENTS

CN          103077823 A      5/2013
JP         2012009813 A      1/2012
(Continued)

OTHER PUBLICATIONS

First Office Action in CN202110408579.5, dated Jun. 16, 2022, 11 pages.
Office Action in JP2020-074502, dated Oct. 11, 2022, 3 pages.

*Primary Examiner* — David M Sinclair
*Assistant Examiner* — Daniel M Dubuisson
(74) *Attorney, Agent, or Firm* — Keating & Bennett, LLP

(57) ABSTRACT

A multilayer ceramic electronic component includes a multilayer body and external electrodes provided on opposing end surfaces of the multilayer body. Each external electrode includes an underlying electrode layer including metal components and ceramic components, and plating layers on the underlying electrode layer. A metal of the plating layer on the underlying electrode layer diffuses into the underlying electrode layer to extend from a surface layer of the underlying electrode layer to an interface of the multilayer body, and exists at an interface where the metal components included in the underlying electrode layer are in contact with each other, an interface where the metal component and the ceramic component included in the underlying electrode layer are in contact with each other, and an interface between the metal component included in the underlying electrode layer and the multilayer body.

14 Claims, 15 Drawing Sheets

ENLARGED VIEW OF a PORTION

(51) Int. Cl.
*H01G 4/012* (2006.01)
*H01G 4/12* (2006.01)
*H01G 4/232* (2006.01)

(52) U.S. Cl.
CPC ......... *H01G 4/1227* (2013.01); *H01G 4/1245* (2013.01); *H01G 4/232* (2013.01)

(56) References Cited

U.S. PATENT DOCUMENTS

| | | |
|---|---|---|
| 2012/0057268 A1 | 3/2012 | Tsutsumi |
| 2014/0292142 A1* | 10/2014 | Nishisaka ................ C03C 8/18 336/200 |
| 2016/0095223 A1* | 3/2016 | Yoshida ................... H01G 4/12 361/301.4 |
| 2017/0103853 A1* | 4/2017 | Zenzai .................... H01G 4/30 |
| 2019/0355518 A1 | 11/2019 | Harada |

FOREIGN PATENT DOCUMENTS

| | | |
|---|---|---|
| JP | 2012-080079 A | 4/2012 |
| JP | 2017-168488 A | 9/2017 |
| JP | 2019-201106 A | 11/2019 |

\* cited by examiner

ENLARGED VIEW OF a PORTION

ENLARGED VIEW OF b PORTION

IV-IV CROSS-SECTIONAL VIEW

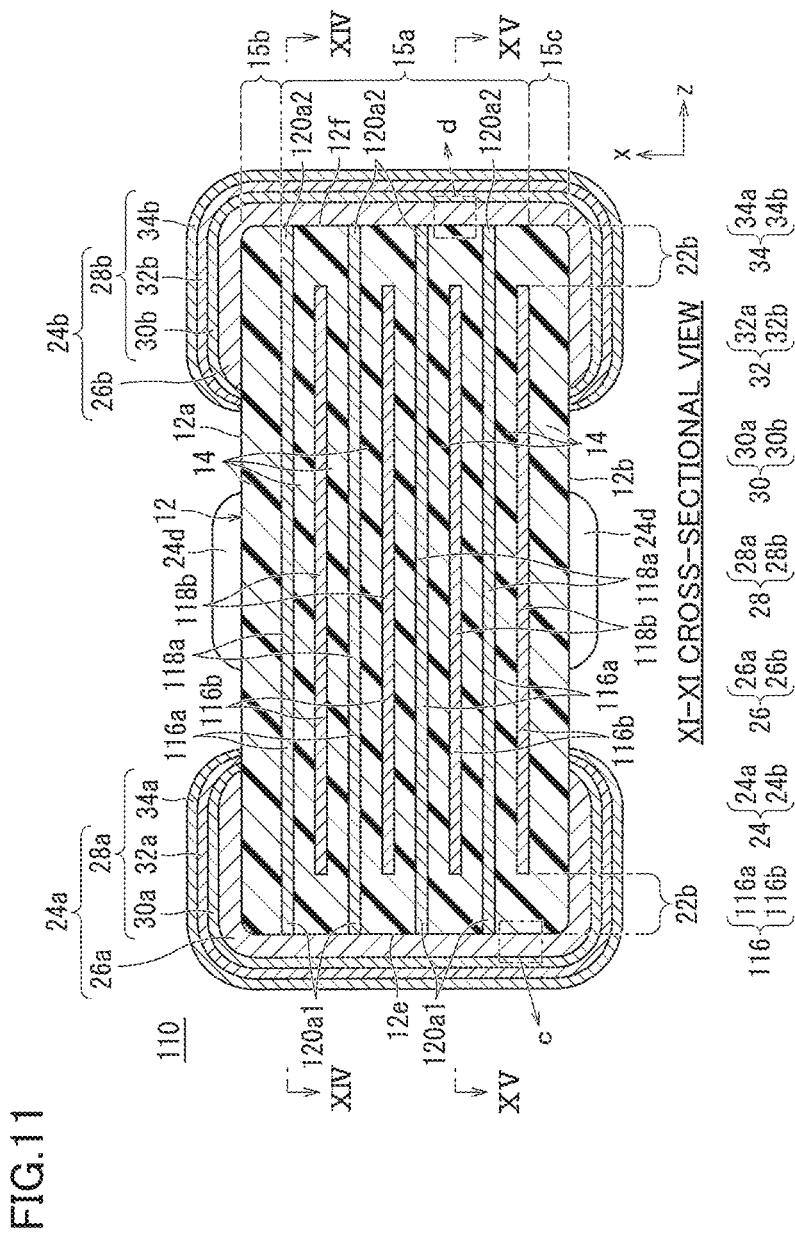

ENLARGED VIEW OF c PORTION

ENLARGED VIEW OF d PORTION

XIII-XIII CROSS-SECTIONAL VIEW

ENLARGED VIEW OF e PORTION

ENLARGED VIEW OF f PORTION

MULTILAYER CERAMIC ELECTRONIC COMPONENT INCLUDING MULTILAYER EXTERNAL ELECTRODES

CROSS REFERENCE TO RELATED APPLICATIONS

This application claims the benefit of priority to Japanese Patent Application No. 2020-074502 filed on Apr. 20, 2020. The entire contents of this application are hereby incorporated herein by reference.

BACKGROUND OF THE INVENTION

1. Field of the Invention

The present invention relates to a multilayer ceramic electronic component.

2. Description of the Related Art

In recent years, multilayer ceramic electronic components, such as multilayer ceramic capacitors, have been used under harsher environment than ever.

Such a general multilayer ceramic capacitor includes a capacitive element (component main body) formed by stacking a plurality of ceramic layers and a plurality of internal electrodes, and an external electrode is formed on an outer surface of the capacitive element. The internal electrodes extend to an end surface and a side surface of the capacitive element and are connected to the external electrode. The external electrode includes, for example, an underlying electrode formed by applying and firing an electrically conductive paste, and a plating layer formed on an outer surface of the underlying electrode. The plating layer may be formed of a plurality of layers, as needed.

For example, Japanese Patent Laid-Open No. 2017-168488 discloses a multilayer ceramic capacitor including an external electrode, the external electrode including an underlying electrode layer mainly composed of Ni, a Cu plating layer formed on an outer surface of the underlying electrode layer, an Ni plating layer formed on an outer surface of the Cu plating layer, and an Sn plating layer formed on an outer surface of the Ni plating layer. In the multilayer ceramic capacitor disclosed in Japanese Patent Laid-Open No. 2017-168488, the Cu plating layer of the external electrode is highly moisture-resistant and has the function of suppressing entry of moisture into the external electrode from outside.

However, although the Cu plating layer is formed on the outer surface of the underlying electrode layer by plating growth and an edge of the Cu plating layer is normally in contact with an outer surface of a capacitive element, the edge of the Cu plating layer and the outer surface of the capacitive element are not strongly joined to each other.

Therefore, when the Cu plating layer has a small thickness, moisture may enter the inside of the external electrode (the inside of a grain boundary and a region between the external electrode and the capacitive element) from outside via a gap between the edge of the Cu plating layer and the outer surface of the capacitive element, and the moisture may reach an internal electrode, which may result in deterioration of the moisture resistance reliability of the multilayer ceramic capacitor.

In addition, a surfactant may, for example, be mixed into a plating solution for forming the Sn plating layer, and the plating solution (moisture) may enter the inside of the external electrode (the inside of a grain boundary and a region between the external electrode and the capacitive element) via a gap between the edge of the Cu plating layer and the outer surface of the capacitive element, which may result in deterioration of properties of the multilayer ceramic capacitor.

In addition, after manufacturing of the multilayer ceramic capacitor is completed, moisture in the atmosphere may enter the inside of the external electrode (the inside of a grain boundary and a region between the external electrode and the capacitive element) via a gap between the edge of the Cu plating layer and the outer surface of the capacitive element, which may result in deterioration of properties of the multilayer ceramic capacitor.

SUMMARY OF THE INVENTION

Preferred embodiments of the present invention provide multilayer ceramic electronic components each having improved reliability by reducing or preventing entry of moisture into the multilayer ceramic electronic component from outside.

A multilayer ceramic electronic component according to a preferred embodiment of the present invention includes a multilayer body including a plurality of stacked ceramic layers; a first main surface and a second main surface that face each other in a height direction; a first side surface and a second side surface that face each other in a width direction orthogonal or substantially orthogonal to the height direction; and a first end surface and a second end surface that face each other in a length direction orthogonal or substantially orthogonal to the height direction and the width direction; a first internal electrode layer on a corresponding one of the plurality of ceramic layers and exposed at the first end surface; a second internal electrode layer on a corresponding one of the plurality of ceramic layers and exposed at the second end surface; a first external electrode connected to the first internal electrode layer and provided on the first end surface; and a second external electrode connected to the second internal electrode layer and provided on the second end surface, wherein the first external electrode includes a first underlying electrode layer on the first end surface of the multilayer body and including metal components and ceramic components; and a plurality of first plating layers on the first underlying electrode layer, the second external electrode includes a second underlying electrode layer on the second end surface of the multilayer body and including metal components and ceramic components; and a plurality of second plating layers on the second underlying electrode layer, a metal of the first plating layer on the first underlying electrode layer, of the plurality of first plating layers, diffuses into the first underlying electrode layer to extend from a surface layer of the first underlying electrode layer to an interface of the multilayer body, and exists at an interface where the metal components included in the first underlying electrode layer are in contact with each other, an interface where the metal component included in the first underlying electrode layer and the ceramic component included in the first underlying electrode layer are in contact with each other, and an interface between the metal component included in the first underlying electrode layer and the multilayer body, and a metal of the second plating layer located on the second underlying electrode layer, of the plurality of second plating layers, diffuses into the second underlying electrode layer to extend from a surface layer of the second underlying electrode layer to an interface of the multilayer body, and exists at an interface where the metal components included in the second underlying electrode layer are in contact with each other, an interface where the metal component included in the second underlying electrode layer and the ceramic component included in the second underlying electrode layer are in contact with each other, and an interface between the metal component included in the second underlying electrode layer and the multilayer body.

In the multilayer ceramic electronic component according to the above-described preferred embodiment of the present invention, the metal of the first plating layer located on the first underlying electrode layer, of the plurality of first plating layers, diffuses into the first underlying electrode layer to extend from the surface layer of the first underlying electrode layer to the interface of the multilayer body, and exists at the interface where the metal components included in the first underlying electrode layer are in contact with each other, the interface where the metal component included in the first underlying electrode layer and the ceramic component included in the first underlying electrode layer are in contact with each other, and the interface between the metal component included in the first underlying electrode layer and the multilayer body, and the metal of the second plating layer located on the second underlying electrode layer, of the plurality of second plating layers, diffuses into the second underlying electrode layer to extend from the surface layer of the second underlying electrode layer to the interface of the multilayer body, and exists at the interface where the metal components included in the second underlying electrode layer are in contact with each other, the interface where the metal component included in the second underlying electrode layer and the ceramic component included in the second underlying electrode layer are in contact with each other, and the interface between the metal component included in the second underlying electrode layer and the multilayer body.

Therefore, the metal of the first plating layer located on the first underlying electrode layer, of the plurality of first plating layers, fills gaps at the interface where the metal components included in the first underlying electrode layer are in contact with each other, the interface where the metal component included in the first underlying electrode layer and the ceramic component included in the first underlying electrode layer are in contact with each other, and the interface between the metal component included in the first underlying electrode layer and the multilayer body, and the metal of the second plating layer located on the second underlying electrode layer, of the plurality of second plating layers, fills gaps at the interface where the metal components included in the second underlying electrode layer are in contact with each other, the interface where the metal component included in the second underlying electrode layer and the ceramic component included in the second underlying electrode layer are in contact with each other, and the interface between the metal component included in the second underlying electrode layer and the multilayer body. Thus, entry of moisture into the multilayer body from outside is able to be reduced or prevented. Accordingly, the moisture resistance reliability of the multilayer ceramic electronic component is able to be improved.

According to preferred embodiments of the present invention, multilayer ceramic electronic components each achieve improved reliability by reducing or preventing entry of moisture from outside.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a cross-sectional view taken along line XI-XI in FIG. 8.

DETAILED DESCRIPTION OF THE PREFERRED EMBODIMENTS

Preferred embodiments of the present invention will be described in detail below with reference to the drawings.

1. Multilayer Ceramic Capacitor

First Preferred Embodiment

Figure 1:
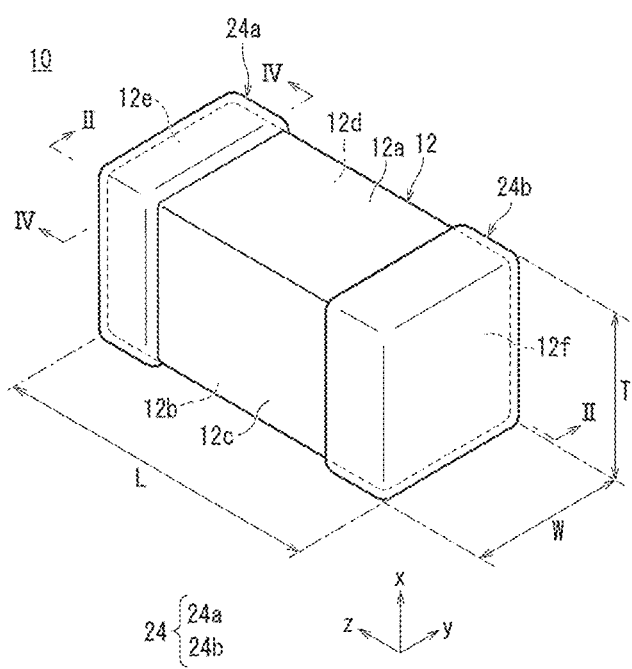
FIG. 1 is an external perspective view showing one example of a multilayer ceramic capacitor according to a first preferred embodiment of the present invention.
Figure 2:
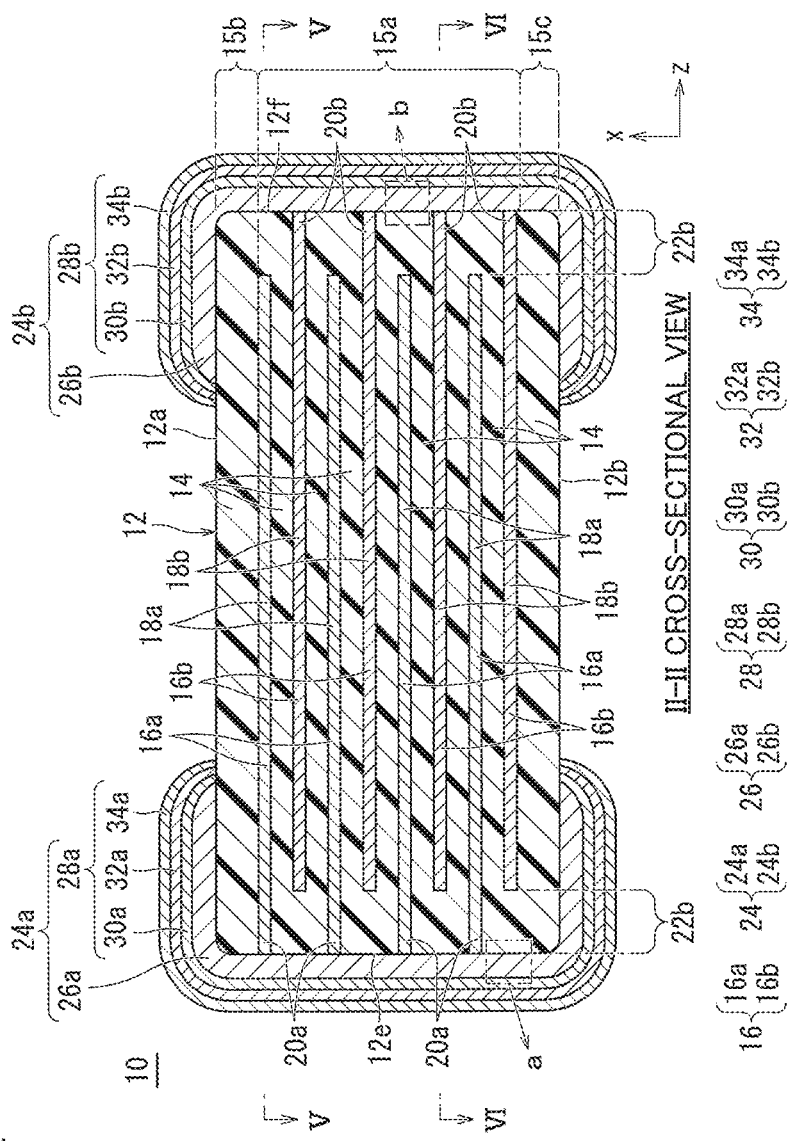
FIG. 2 is a cross-sectional view taken along line II-II in FIG. 1.
Figure 3A:
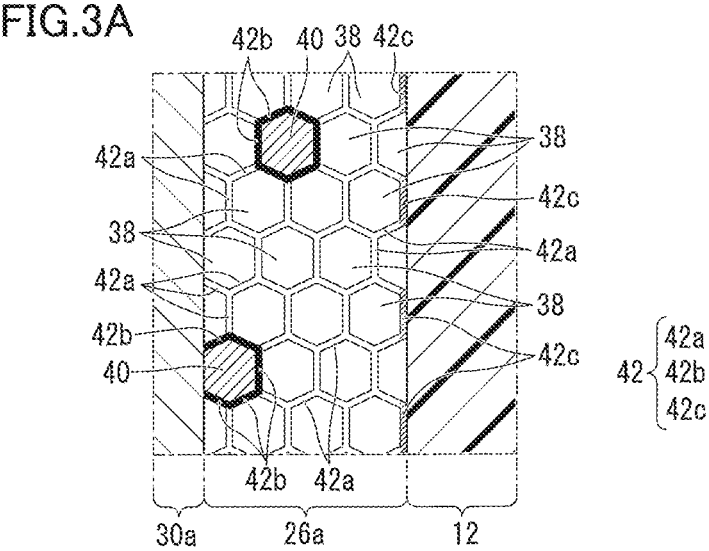
FIG. 3A is a partial enlarged cross-sectional view of an a portion shown in FIG. 2.
Figure 3B:
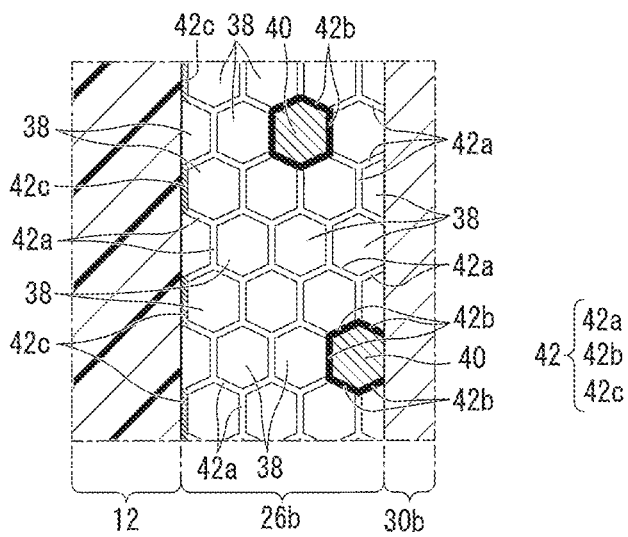
FIG. 3B is a partial enlarged cross-sectional view of a b portion shown in FIG. 2.
Figure 4:
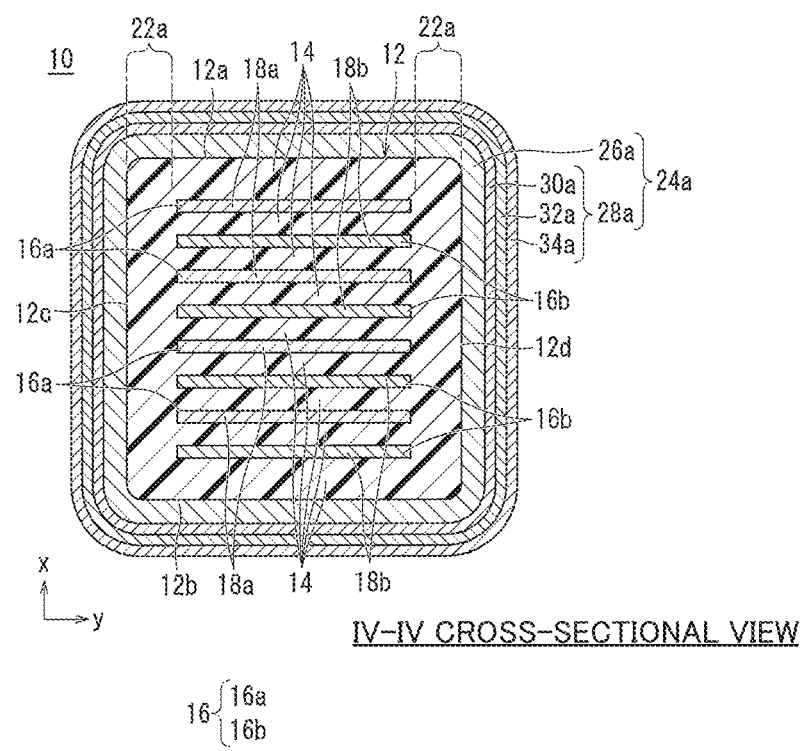
FIG. 4 is a cross-sectional view taken along line IV-IV in FIG. 1.
Figure 5:
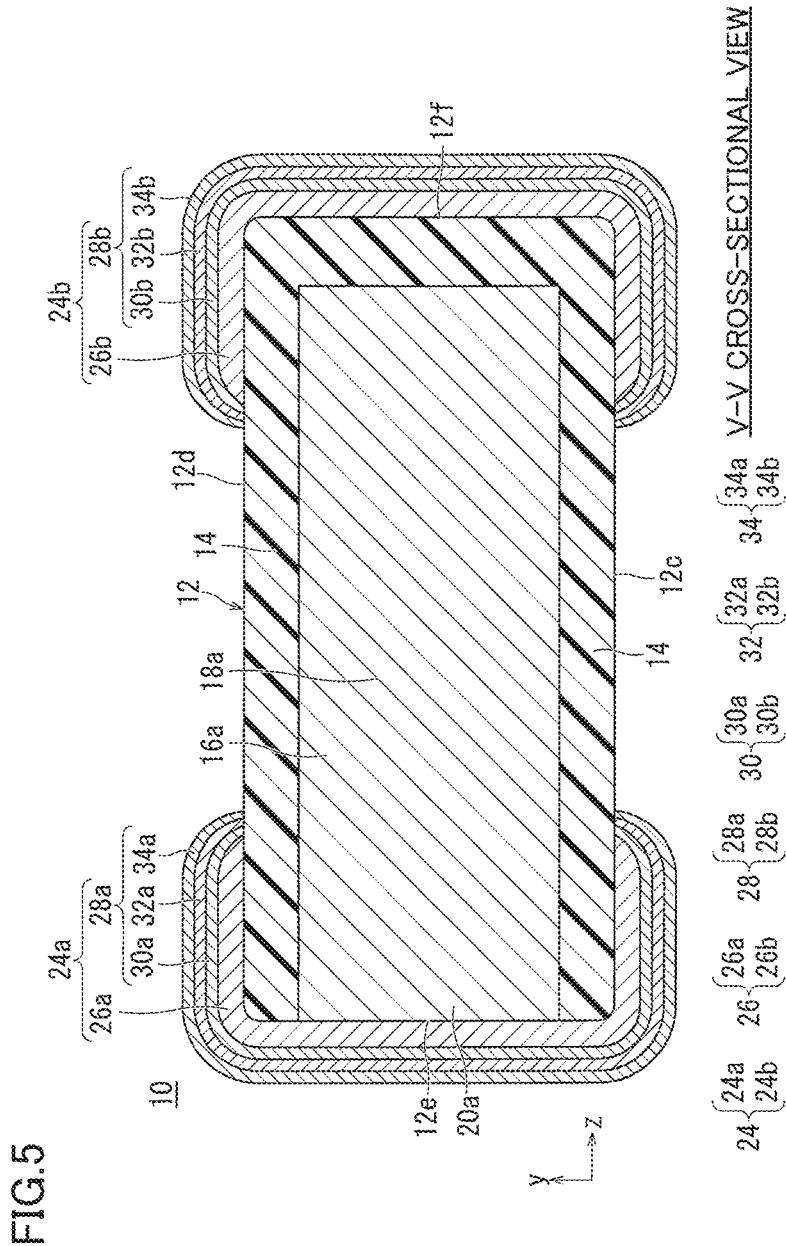
FIG. 5 is a cross-sectional view taken along line V-V in FIG. 2.
Figure 6:
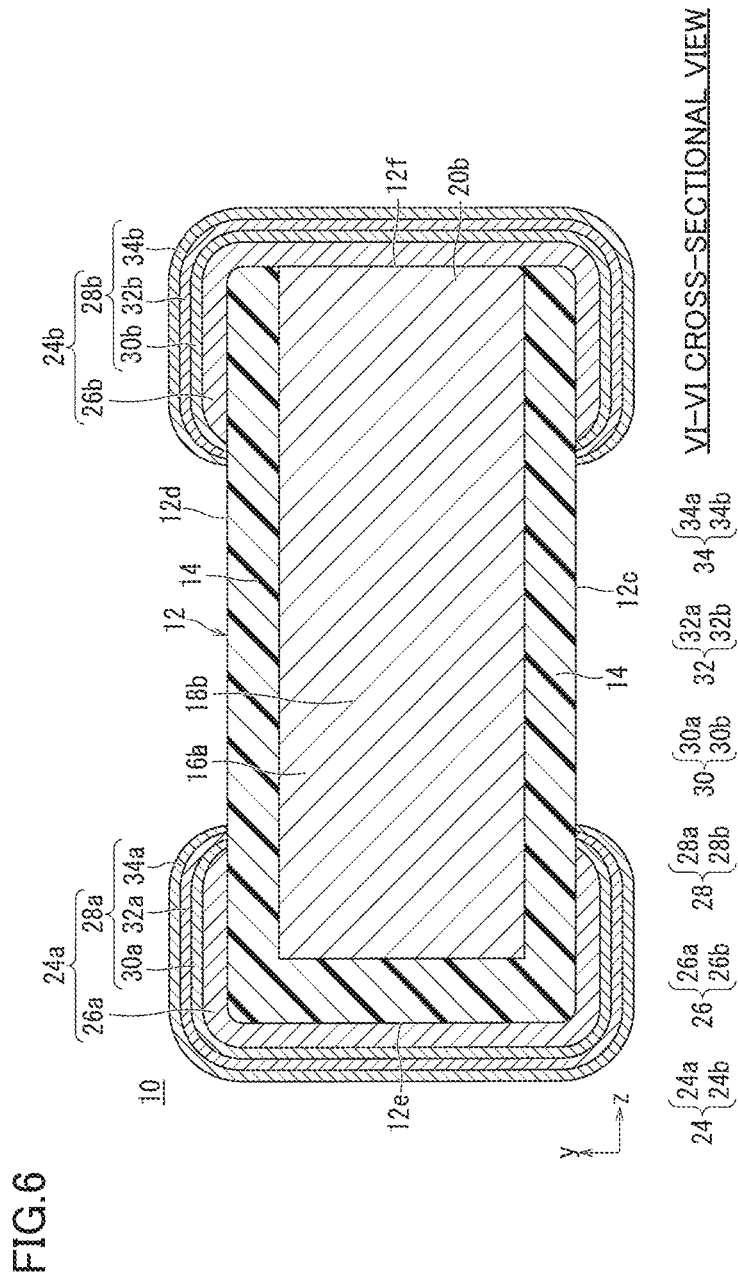
FIG. 6 is a cross-sectional view taken along line VI-VI in FIG. 2.

A multilayer ceramic capacitor will be described as an example of a multilayer ceramic electronic component according to a first preferred embodiment of the present invention. FIG. 1 is an external perspective view showing one example of a multilayer ceramic capacitor according to the first preferred embodiment of the present invention. FIG. 2 is a cross-sectional view taken along line II-II in FIG. 1. FIG. 3A is a partial enlarged cross-sectional view of an a portion shown in FIG. 2, and FIG. 3B is a partial enlarged cross-sectional view of a b portion shown in FIG. 2. FIG. 4 is a cross-sectional view taken along line IV-IV in FIG. 1. FIG. 5 is a cross-sectional view taken along line V-V in FIG. 2. FIG. 6 is a cross-sectional view taken along line VI-VI in FIG. 2.

As shown in FIGS. 1 to 4, a multilayer ceramic capacitor includes a multilayer body 12 having a rectangular or substantially rectangular parallelepiped shape.

Multilayer body 12 includes a plurality of stacked ceramic layers 14 and a plurality of internal electrode layers 16. Multilayer body 12 further includes a first main surface 12a and a second main surface 12b that face each other in a height direction x, a first side surface 12c and a second side surface 12d that face each other in a width direction y orthogonal or substantially orthogonal to height direction x, and a first end surface 12e and a second end surface 12f that face each other in a length direction z orthogonal or substantially orthogonal to height direction x and width direction y. A corner portion and a ridge portion of multilayer body 12 are preferably rounded. The corner portion refers to a portion where adjacent three planes of the multilayer body intersect, and the ridge portion refers to a portion where adjacent two planes of the multilayer body intersect. In addition, a portion or all of first main surface 12a and second main surface 12b, first side surface 12c and second side surface 12d, and first end surface 12e and second end surface 12f may be provided with projections and recesses, or the like. Furthermore, a dimension of multilayer body 12 in length direction z is not necessarily longer than a dimension of multilayer body 12 in width direction y.

The number of ceramic layers 14 including outer layers is preferably equal to or more than 15 and equal to or less than 700, for example.

In a stacking direction that connects first main surface 12a and second main surface 12b, multilayer body 12 includes an effective layer portion 15a where internal electrode layers 16 face each other, a first outer layer portion 15b located between one of internal electrode layers 16 that is closest to first main surface 12a and first main surface 12a, and a second outer layer portion 15c located between one of internal electrode layers 16 that is closest to second main surface 12b and second main surface 12b.

First outer layer portion 15b includes a plurality of ceramic layers 14 located on the first main surface 12a side of multilayer body 12 and located between first main surface 12a and one of internal electrode layers 16 that is closest to first main surface 12a.

Second outer layer portion 15c includes a plurality of ceramic layers 14 located on the second main surface 12b side of multilayer body 12 and located between second main surface 12b and one of internal electrode layers 16 that is closest to second main surface 12b.

A region sandwiched between first outer layer portion 15b and second outer layer portion 15c corresponds to effective layer portion 15a.

Although not particularly limited, a dimension of multilayer body 12 in length direction z is preferably equal to or more than about 0.2 mm and equal to or less than about 10.0 mm, a dimension of multilayer body 12 in width direction y is preferably equal to or more than about 0.1 mm and equal to or less than about 10.0 mm, and a dimension of multilayer body 12 in height direction x is preferably equal to or more than about 0.1 mm and equal to or less than about 5.0 mm, for example.

Ceramic layer 14 can be made of a dielectric material as a ceramic material, for example. A dielectric ceramic including a component such as $BaTiO_3$, $CaTiO_3$, $SrTiO_3$, or $CaZrO_3$ can, for example, be used as the dielectric material. When the above-described dielectric material is included as a main component, a sub-component lower in content than the main component, such as an Mn compound, an Fe compound, a Cr compound, a Co compound, or an Ni compound, may be added, for example, depending on the desired properties of multilayer body 12.

When a piezoelectric ceramic is used for multilayer body 12, the multilayer ceramic electronic component defines and functions as a ceramic piezoelectric element. Specific examples of the piezoelectric ceramic material include, for example, a lead zirconate titanate (PZT)-based ceramic material and the like.

When a semiconductor ceramic is used for multilayer body 12, the multilayer ceramic electronic component defines and functions as a thermistor element. Specific examples of the semiconductor ceramic material include, for example, a spinel-based ceramic material and the like.

When a magnetic ceramic is used for multilayer body 12, the multilayer ceramic electronic component defines and functions as an inductor element. When the multilayer ceramic electronic component functions as an inductor element, internal electrode layer 16 is a coil-shaped conductor. Specific examples of the magnetic ceramic material include, for example, a ferrite ceramic material and the like.

A thickness of fired ceramic layer 14 is preferably equal to or more than about 0.4 µm and equal to or less than about 10.0 µm, for example.

As shown in FIGS. 5 and 6, multilayer body 12 includes, as the plurality of internal electrode layers 16, a plurality of first internal electrode layers 16a and a plurality of second internal electrode layers 16b, each having a rectangular or substantially rectangular shape, for example. The plurality of first internal electrode layers 16a and the plurality of second internal electrode layers 16b are embedded to be alternately arranged and equally or substantially equally spaced along the stacking direction of multilayer body 12. First internal electrode layers 16a and second internal electrode layers 16b may be arranged in parallel or substantially in parallel with a mounting surface, or may be arranged perpendicularly or substantially perpendicularly to the mounting surface.

Each first internal electrode layer 16a includes a first facing electrode portion 18a that faces second internal electrode layer 16b, and a first extending electrode portion 20a located on the one end side of first internal electrode layer 16a and extending from first facing electrode portion 18a to first end surface 12e of multilayer body 12. First extending electrode portion 20a includes an end portion extending to first end surface 12e and exposed at first end surface 12e.

Each second internal electrode layer 16b includes a second facing electrode portion 18b that faces first internal electrode layer 16a, and a second extending electrode portion 20b located on the one end side of second internal electrode layer 16b and extending from second facing electrode portion 18b to second end surface 12f of multilayer body 12. Second extending electrode portion 20b includes an end portion extending to second end surface 12f and exposed at second end surface 12f.

Although not particularly limited, it is preferable that first facing electrode portion 18a of first internal electrode layer 16a and second facing electrode portion 18b of second internal electrode layer 16b each have a rectangular or substantially rectangular shape. First facing electrode portion 18a of first internal electrode layer 16a and second facing electrode portion 18b of second internal electrode layer 16b may include a rounded corner portion or an inclined (tapered) corner portion, for example.

Although not particularly limited, it is preferable that first extending electrode portion 20a of first internal electrode layer 16a and second extending electrode portion 20b of second internal electrode layer 16b each have a rectangular or substantially rectangular shape. First extending electrode portion 20a of first internal electrode layer 16a and second extending electrode portion 20b of second internal electrode layer 16b may include a rounded corner portion or an inclined (tapered) corner portion, for example.

First facing electrode portion 18a of first internal electrode layer 16a and first extending electrode portion 20a of first internal electrode layer 16a may have the same or substantially the same width, or one of first facing electrode portion 18a of first internal electrode layer 16a and first extending electrode portion 20a of first internal electrode layer 16a may have a narrower width than that of the other. Similarly, second facing electrode portion 18b of second internal electrode layer 16b and second extending electrode portion 20b of second internal electrode layer 16b may have the same or substantially the same width, or one of second facing electrode portion 18b of second internal electrode layer 16b and second extending electrode portion 20b of second internal electrode layer 16b may have a narrower width than that of the other.

Multilayer body 12 includes a side portion (W gap) 22a of multilayer body 12 provided between first side surface 12c and one end of each of first facing electrode portion 18a and second facing electrode portion 18b in width direction y, and between second side surface 12d and the other end of each of first facing electrode portion 18a and second facing electrode portion 18b in width direction y. Multilayer body 12 further includes an end portion (L gap) 22b of multilayer body 12 provided between second end surface 12f and an end of first internal electrode layer 16a opposite to first extending electrode portion 20a, and between first end surface 12e and an end of second internal electrode layer 16b opposite to second extending electrode portion 20b.

Internal electrode layer 16 includes an appropriate electrically conductive material made of, for example, metals such as Ni, Cu, Ag, Pd, and Au, an alloy including at least one of these metals, such as an Ag—Pd alloy, or the like. Internal electrode layer 16 may further include dielectric particles having the same or substantially the same composition as that of the ceramic included in ceramic layer 14.

A thickness of internal electrode layer 16 is preferably equal to or more than about 0.2 μm and equal to or less than about 2.0 μm, for example. The number of internal electrode layers 16 is preferably equal to or more than 15 and equal to or less than 200, for example.

An external electrode 24 is provided on the first end surface 12e side and the second end surface 12f side of multilayer body 12. External electrode 24 includes a first external electrode 24a and a second external electrode 24b.

First external electrode 24a is provided on first end surface 12e of multilayer body 12 and extends from first end surface 12e to partially cover first main surface 12a, second main surface 12b, first side surface 12c, and second side surface 12d. In this case, first external electrode 24a is electrically connected to first extending electrode portion 20a of first internal electrode layer 16a. First external electrode 24a may be provided only on first end surface 12e of multilayer body 12.

Second external electrode 24b is provided on second end surface 12f of multilayer body 12 and extends from second end surface 12f to partially cover first main surface 12a, second main surface 12b, first side surface 12c, and second side surface 12d. In this case, second external electrode 24b is electrically connected to second extending electrode portion 20b of second internal electrode layer 16b. Second external electrode 24b may be provided only on second end surface 12f of multilayer body 12.

In multilayer body 12, first facing electrode portion 18a of first internal electrode layer 16a and second facing electrode portion 18b of second internal electrode layer 16b face each other with ceramic layer 14 being interposed, to generate a capacitance. Therefore, the capacitance can be obtained between first external electrode 24a to which first internal electrode layer 16a is connected and second external electrode 24b to which second internal electrode layer 16b is connected, to provide the properties of the capacitor.

Figure 7A:
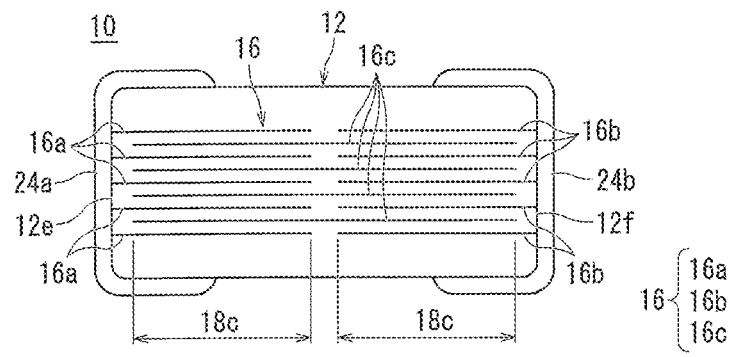
FIG. 7A is a cross-sectional view taken along line II-II in FIG. 1, showing a structure in which a facing electrode portion of an internal electrode layer of the multilayer ceramic capacitor according to the first preferred embodiment of the present invention is divided into two sections.
Figure 7B:
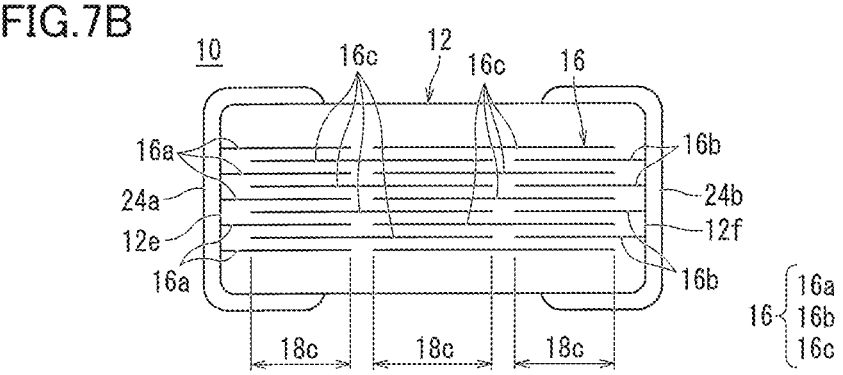
FIG. 7B is a cross-sectional view taken along line II-II in FIG. 1, showing a structure in which the facing electrode portion of the internal electrode layer of the multilayer ceramic capacitor according to the first preferred embodiment of the present invention is divided into three sections.
Figure 7C:
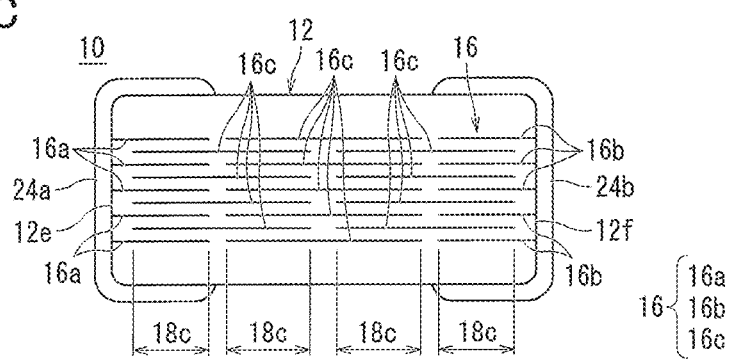
FIG. 7C is a cross-sectional view taken along line II-II in FIG. 1, showing a structure in which the facing electrode portion of the internal electrode layer of the multilayer ceramic capacitor according to the first preferred embodiment of the present invention is divided into four sections.

As shown in FIGS. 7A to 7C, floating internal electrode layers 16c not extending to first end surface 12e and second end surface 12f may be provided as internal electrode layers 16, in addition to first internal electrode layers 16a and second internal electrode layers 16b, thus providing a structure in which a facing electrode portion 18c is divided into a plurality of sections by floating internal electrode layers 16c. Examples of the structure include a two-stage structure as shown in FIG. 7A, a three-stage structure as shown in FIG. 7B, a four-stage structure as shown in FIG. 7C, and a more-than-four-stage structure. Due to the above-described structure in which facing electrode portion 18c is divided into a plurality of sections, a plurality of capacitor components are generated among first internal electrode layers 16a, second internal electrode layers 16b, and third internal electrode layers 16c that face one another, and these capacitor components are serially connected. Therefore, a voltage applied to each capacitor component can be reduced and a higher withstand voltage of the multilayer ceramic capacitor can be achieved.

External electrode 24 includes an underlying electrode layer 26 provided on a surface of multilayer body 12, and a plating layer 28 covering underlying electrode layer 26.

Underlying electrode layer 26 includes a first underlying electrode layer 26a and a second underlying electrode layer 26b.

First underlying electrode layer 26a is provided on first end surface 12e of multilayer body 12 and extends from first end surface 12e to partially cover first main surface 12a, second main surface 12b, first side surface 12c, and second side surface 12d.

Second underlying electrode layer 26b is provided on second end surface 12f of multilayer body 12 and extends from second end surface 12f to partially cover first main surface 12a, second main surface 12b, first side surface 12c, and second side surface 12d.

First underlying electrode layer 26a may be provided only on first end surface 12e of multilayer body 12, and second underlying electrode layer 26b may be provided only on second end surface 12f of multilayer body 12.

A thickness of each of central portions, in the stacking direction, of first underlying electrode layer 26a located on first end surface 12e and second underlying electrode layer 26b located on second end surface 12f is preferably equal to or more than about 3 μm and equal to or less than about 160 μm, for example.

When underlying electrode layer 26 is provided on first and second main surfaces 12a and 12b and first and second side surfaces 12c and 12d, a thickness of each of central portions, in length direction z, of first underlying electrode layer 26a and second underlying electrode layer 26b located on first and second main surfaces 12a and 12b and first and second side surfaces 12c and 12d is preferably equal to or more than about 3 μm and equal to or less than about 40 μm, for example.

A baked layer defining and functioning as underlying electrode layer 26 includes a metal component and a ceramic component. The metal component of the baked layer includes, for example, at least one selected from Cu, Ni, Ag, Pd, an Ag—Pd alloy, Au and the like. The metal component of the baked layer is preferably Ni, for example. As the ceramic component of the baked layer, a ceramic material of the same or substantially the same type as that of ceramic layer 14 may be used, or a ceramic material of a type different from that of ceramic layer 14 may be used. The ceramic component includes, for example, at least one selected from $BaTiO_3$, $CaTiO_3$, $(Ba, Ca)TiO_3$, $SrTiO_3$, $CaZrO_3$ and the like. The baked layer may include a plurality of layers. The baked layer is formed by applying an electrically conductive paste including a ceramic component and a metal component to multilayer body 12 and baking the electrically conductive paste, and a multilayer chip including internal electrode layers 16 and ceramic layers 14 before firing and the electrically conductive paste applied to the multilayer chip are simultaneously fired. The baked layer defining and functioning as underlying electrode layer 26 may further include a glass component. The glass component of the baked layer includes, for example, at least one selected from B, Si, Ba, Mg, Al, Li and the like.

Since the multilayer ceramic electronic component according to the present preferred embodiment is defined by multilayer ceramic capacitor 10, underlying electrode layer 26 includes the metal component and the ceramic component made of a dielectric material in the present preferred embodiment as described above. However, the present invention is not limited to the above-described configuration. In other words, when the multilayer ceramic electronic component is a piezoelectric ceramic, a semiconductor ceramic, or a magnetic ceramic as described above, a specific component of the ceramic component included in underlying electrode layer 26 is different.

Specifically, when a piezoelectric ceramic is used for multilayer body 12, examples of the piezoelectric ceramic material, which is the ceramic material included in underlying electrode layer 26, include a lead zirconate titanate (PZT)-based ceramic material and the like.

When a semiconductor ceramic is used for multilayer body 12, examples of the semiconductor ceramic material, which is the ceramic material included in underlying electrode layer 26, include a spinel-based ceramic material and the like.

When a magnetic ceramic is used for multilayer body 12, examples of the magnetic ceramic material, which is the ceramic material included in underlying electrode layer 26, include a ferrite ceramic material and the like.

Plating layer 28 includes a first plating layer 28a and a second plating layer 28b.

First plating layer 28a covers first underlying electrode layer 26a.

Second plating layer 28b covers second underlying electrode layer 26b.

Plating layer 28 may include a plurality of layers.

Preferably, plating layer 28 includes a lower plating layer 30 that covers underlying electrode layer 26, an intermediate plating layer 32 that covers lower plating layer 30, and an upper plating layer 34 that covers intermediate plating layer 32.

Intermediate plating layer 32 and upper plating layer 34 of plating layer 28 include at least one selected from Ni, Sn, Cu, Ag, Pd, an Ag—Pd alloy, Au and the like, for example.

Lower plating layer 30 includes a first lower plating layer 30a and a second lower plating layer 30b. Lower plating layer 30 is located on the underlying electrode layer.

First lower plating layer 30a covers first underlying electrode layer 26a. Specifically, it is preferable that first lower plating layer 30a is provided on a portion of a surface of first underlying electrode layer 26a corresponding to first end surface 12e, and also extends to portions of the surface of first underlying electrode layer 26a corresponding to first main surface 12a, second main surface 12b, first side surface 12c, and second side surface 12d. First lower plating layer 30a may be provided only on the surface of first underlying electrode layer 26a arranged on first end surface 12e.

Second lower plating layer 30b covers second underlying electrode layer 26b. Specifically, it is preferable that second lower plating layer 30b is provided on a portion of a surface of second underlying electrode layer 26b corresponding to second end surface 12f, and also extends to portions of the surface of second underlying electrode layer 26b corresponding to first main surface 12a, second main surface 12b, first side surface 12c, and second side surface 12d. Second lower plating layer 30b may be provided only on the surface of second underlying electrode layer 26b arranged on second end surface 12f.

In the present preferred embodiment, a metal included in lower plating layer 30 is preferably Cu, for example. Therefore, lower plating layer 30 is preferably a Cu plating layer. Lower plating layer 30 is a Cu plating layer and covers the surface of underlying electrode layer 26, thus reducing or preventing entry of a plating solution.

Intermediate plating layer 32 includes a first intermediate plating layer 32a and a second intermediate plating layer 32b.

First intermediate plating layer 32a covers first lower plating layer 30a. Specifically, it is preferable that first intermediate plating layer 32a is provided on a portion of a surface of first lower plating layer 30a corresponding to first end surface 12e, and also extends to portions of the surface of first lower plating layer 30a corresponding to first main surface 12a, second main surface 12b, first side surface 12c, and second side surface 12d. First intermediate plating layer 32a may be provided only on the portion of the surface of first lower plating layer 30a corresponding to first end surface 12e.

Second intermediate plating layer 32b covers second lower plating layer 30b. Specifically, it is preferable that second intermediate plating layer 32b is provided on a portion of a surface of second lower plating layer 30b corresponding to second end surface 12f, and also extends to portions of the surface of second lower plating layer 30b corresponding to first main surface 12a, second main surface 12b, first side surface 12c, and second side surface 12d. Second intermediate plating layer 32b may be provided only on the portion of the surface of second lower plating layer 30b corresponding to second end surface 12f.

In the present preferred embodiment, intermediate plating layer 32 is preferably a Ni plating layer, for example. Intermediate plating layer 32 is preferably a Ni plating layer and covers the surface of lower plating layer 30, which makes it possible to prevent underlying electrode layer 26 from being eroded by solder when multilayer ceramic capacitor 10 is mounted on a mounting substrate.

Upper plating layer 34 includes a first upper plating layer 34a and a second upper plating layer 34b.

First upper plating layer 34a covers first intermediate plating layer 32a. Specifically, it is preferable that first upper plating layer 34a is provided on a portion of a surface of first intermediate plating layer 32a corresponding to first end surface 12e, and also extends to portions of the surface of first intermediate plating layer 32a corresponding to first main surface 12a, second main surface 12b, first side surface 12c, and second side surface 12d. First upper plating layer 34a may be provided only on the portion of the surface of first intermediate plating layer 32a corresponding to first end surface 12e.

Second upper plating layer 34b covers second intermediate plating layer 32b. Specifically, it is preferable that second upper plating layer 34b is provided on a portion of a surface of second intermediate plating layer 32b corresponding to second end surface 12f, and also extends to portions of the surface of second intermediate plating layer 32b corresponding to first main surface 12a, second main surface 12b, first side surface 12c, and second side surface 12d. Second upper plating layer 34b may be provided only on the portion of the surface of second intermediate plating layer 32b corresponding to second end surface 12f.

In the present preferred embodiment, upper plating layer 34 is preferably an Sn plating layer, for example. Upper plating layer 34 is an Sn plating layer and covers the surface of intermediate plating layer 32, which makes it possible to improve the wettability of solder when multilayer ceramic capacitor 10 is mounted on a mounting substrate, and to easily mount multilayer ceramic capacitor 10.

A thickness of each of lower plating layer 30, intermediate plating layer 32 and upper plating layer 34 is preferably equal to or more than about 2 μm and equal to or less than about 15 μm, for example. More specifically, an average thickness of lower plating layer 30 is preferably equal to or more than about 5 μm and equal to or less than about 8 μm, an average thickness of intermediate plating layer 32 is preferably equal to or more than about 2 μm and equal to or less than about 4 μm, and an average thickness of upper plating layer 34 is preferably equal to or more than about 2 μm and equal to or less than about 4 μm, for example.

External electrode 24 according to the present preferred embodiment includes plating layer 28 including three layers, i.e., lower plating layer 30, intermediate plating layer 32, and upper plating layer 34. However, plating layer 28 may include two layers, i.e., lower plating layer 30 and intermediate plating layer 32, or lower plating layer 30 and upper plating layer 34.

As shown in FIGS. 3A and 3B, in multilayer ceramic capacitor 10 shown in FIG. 1, the metal of lower plating layer 30 diffuses into underlying electrode layer 26 and extends from the surface of underlying electrode layer 26 to an interface 42 between multilayer body 12 and underlying electrode layer 26. The metal of lower plating layer 30 is preferably Cu, for example.

That is, as shown in FIG. 3A, the metal of first lower plating layer 30a exists at an interface 42a where metal components 38 included in first underlying electrode layer 26a are in contact with each other, an interface 42b where metal component 38 included in first underlying electrode layer 26a and a ceramic component (co-material) 40 included in first underlying electrode layer 26a are in contact with each other, and an interface 42c between metal component 38 included in first underlying electrode layer 26a and multilayer body 12.

Similarly, as shown in FIG. 3B, the metal of second lower plating layer 30b exists at interface 42a where metal components 38 included in second underlying electrode layer 26b are in contact with each other, interface 42b where metal component 38 included in second underlying electrode layer 26b and ceramic component (co-material) 40 included in second underlying electrode layer 26b are in contact with each other, and interface 42c between metal component 38 included in second underlying electrode layer 26b and multilayer body 12.

Therefore, the metal of lower plating layer 30 fills gaps at respective interfaces 42 described above, and thus, entry of moisture into multilayer body 12 from outside can be reduced or prevented. Accordingly, the moisture resistance reliability of multilayer ceramic capacitor 10 can be improved.

A dimension, in length direction z, of multilayer ceramic capacitor 10 including multilayer body 12, first external electrode 24a and second external electrode 24b is defined as an L dimension. A dimension, in height direction x, of multilayer ceramic capacitor 10 including multilayer body 12, first external electrode 24a and second external electrode 24b is defined as a T dimension. A dimension, in width direction y, of multilayer ceramic capacitor 10 including multilayer body 12, first external electrode 24a and second external electrode 24b is defined as a W dimension.

A dimension of multilayer ceramic capacitor 10 is preferably such that the L dimension in length direction z is equal to or more than about 0.20 mm and equal to or less than about 10.0 mm, the W dimension in width direction y is equal to or more than about 0.10 mm and equal to or less than about 10.0 mm, and the T dimension in height direction x is equal to or more than about 0.10 mm and equal to or less than about 5.0 mm, for example.

In multilayer ceramic capacitor 10 shown in FIG. 1, the metal of lower plating layer 30 exists at interface 42a where metal components 38 included in underlying electrode layer 26 are in contact with each other, interface 42b where metal component 38 included in underlying electrode layer 26 and ceramic component (co-material) 40 included in underlying electrode layer 26 are in contact with each other, and interface 42c between metal component 38 included in underlying electrode layer 26 and multilayer body 12. Therefore, the metal of lower plating layer 30 fills the gaps at respective interfaces 42 described above, and thus, entry of moisture into multilayer body 12 from outside can be reduced or prevented. Accordingly, the moisture resistance reliability of multilayer ceramic capacitor 10 can be improved.

Second Preferred Embodiment

A multilayer ceramic capacitor will be described as an example of a multilayer ceramic electronic component according to a second preferred embodiment of the present invention. The multilayer ceramic capacitor according to the second preferred embodiment is a three-terminal multilayer ceramic capacitor.

Figure 8:
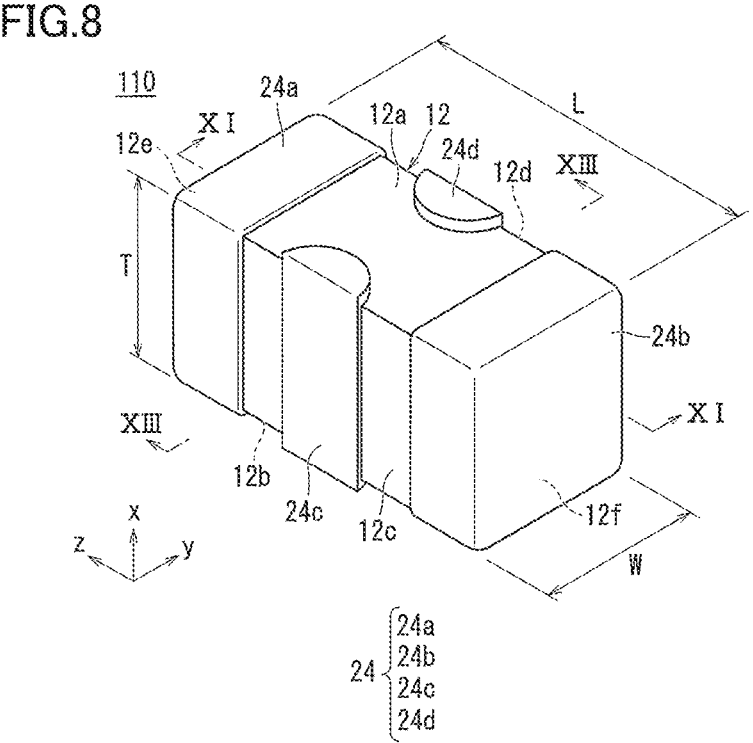
FIG. 8 is an external perspective view showing one example of a multilayer ceramic capacitor (three-terminal multilayer ceramic capacitor) according to a second preferred embodiment of the present invention.
Figure 9:
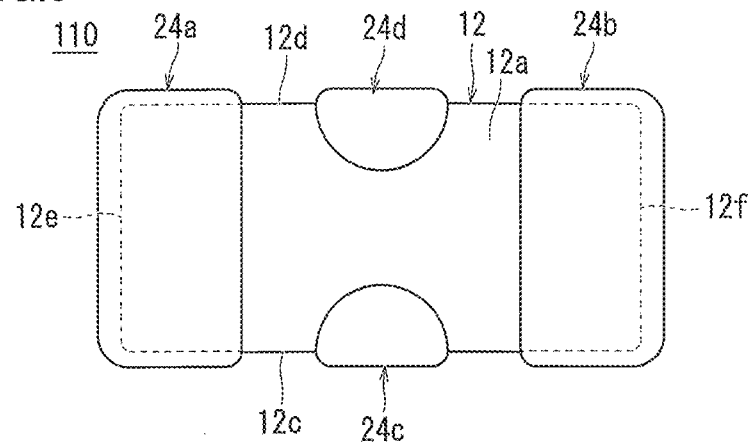
FIG. 9 is a top view showing another example of the multilayer ceramic capacitor (three-terminal multilayer ceramic capacitor) according to the second preferred embodiment of the present invention.
Figure 10:
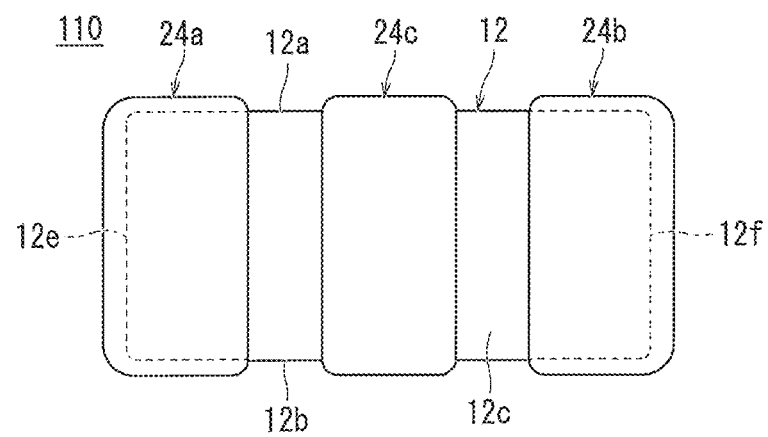
FIG. 10 is a side view showing another example of the multilayer ceramic capacitor (three-terminal-type multilayer ceramic capacitor) according to the second preferred embodiment of the present invention.
Figure 12A:
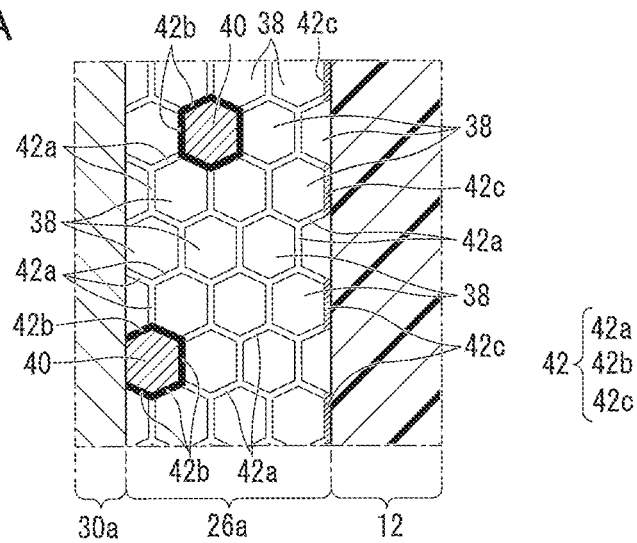
FIG. 12A is a partial enlarged cross-sectional view of a c portion shown in FIG. 11.
Figure 12B:
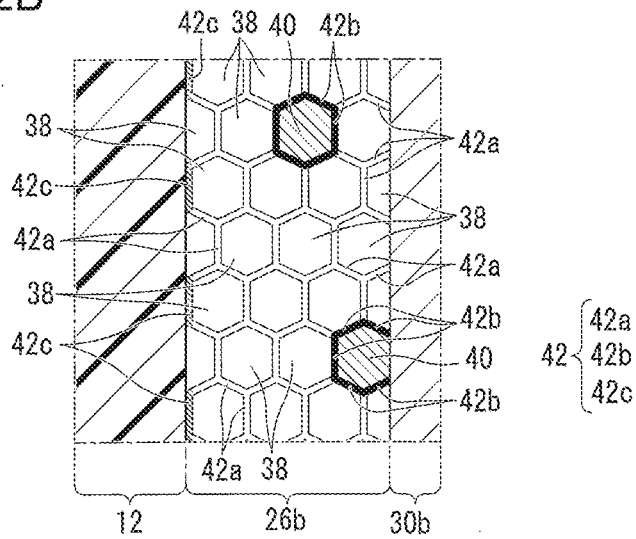
FIG. 12B is a partial enlarged cross-sectional view of a d portion shown in FIG. 11.
Figure 13A:
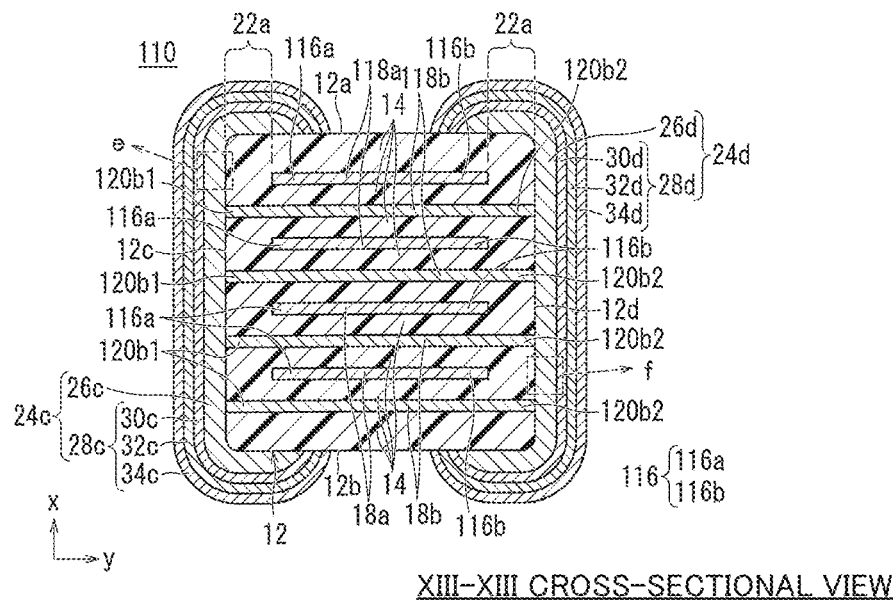
FIG. 13A is a cross-sectional view taken along line XIII-XIII in FIG. 8.
Figure 13B:
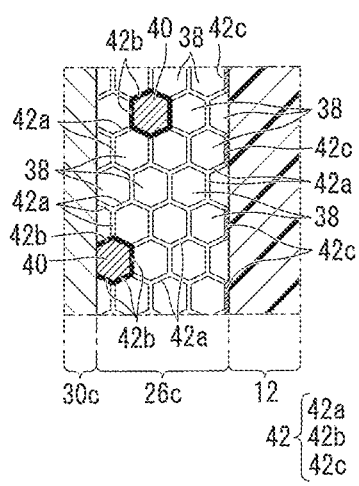
FIG. 13B is a partial enlarged cross-sectional view of an e portion shown in FIG. 13A.
Figure 13C:
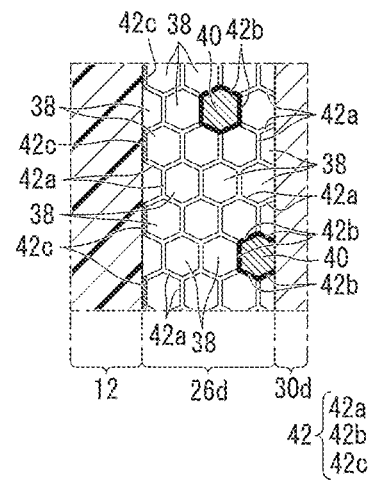
FIG. 13C is a partial enlarged cross-sectional view of an f portion shown in FIG. 13A.
Figure 14:
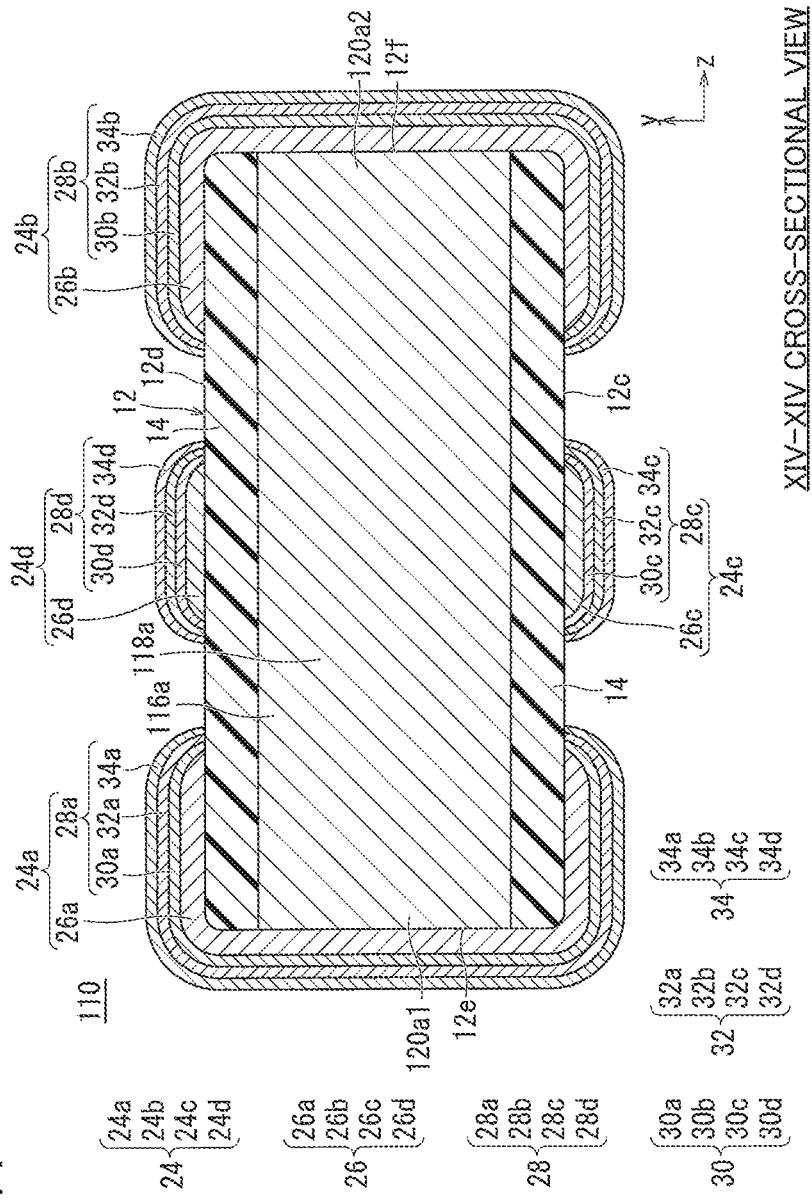
FIG. 14 is a cross-sectional view taken along line XIV-XIV in FIG. 11.
Figure 15:
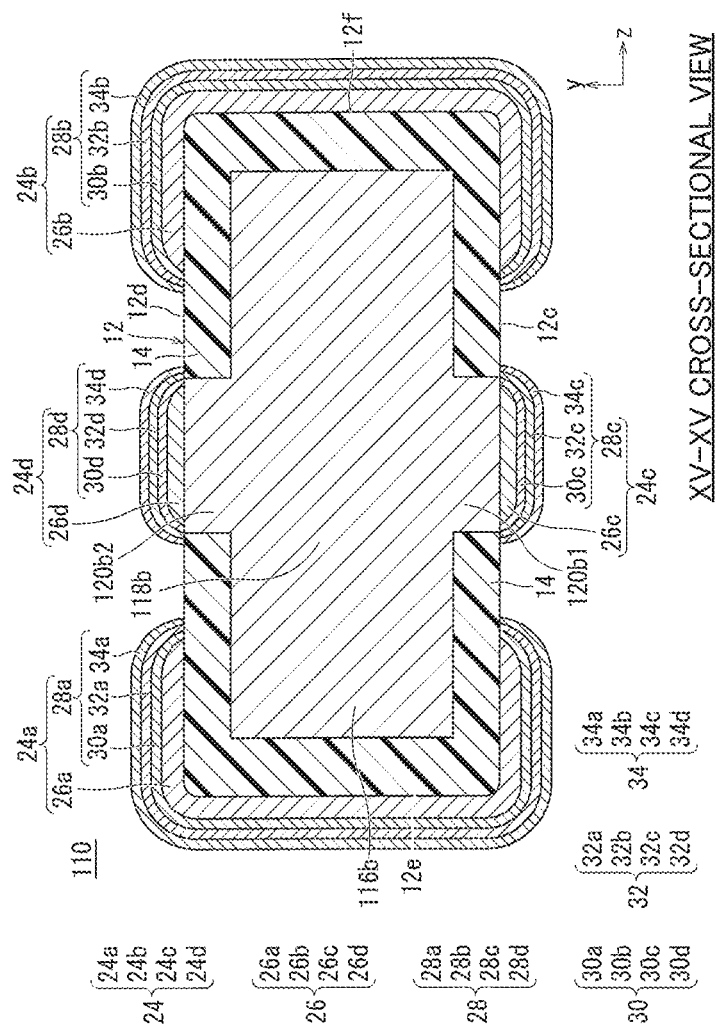
FIG. 15 is a cross-sectional view taken along line XV-XV in FIG. 11.
Figure 16:
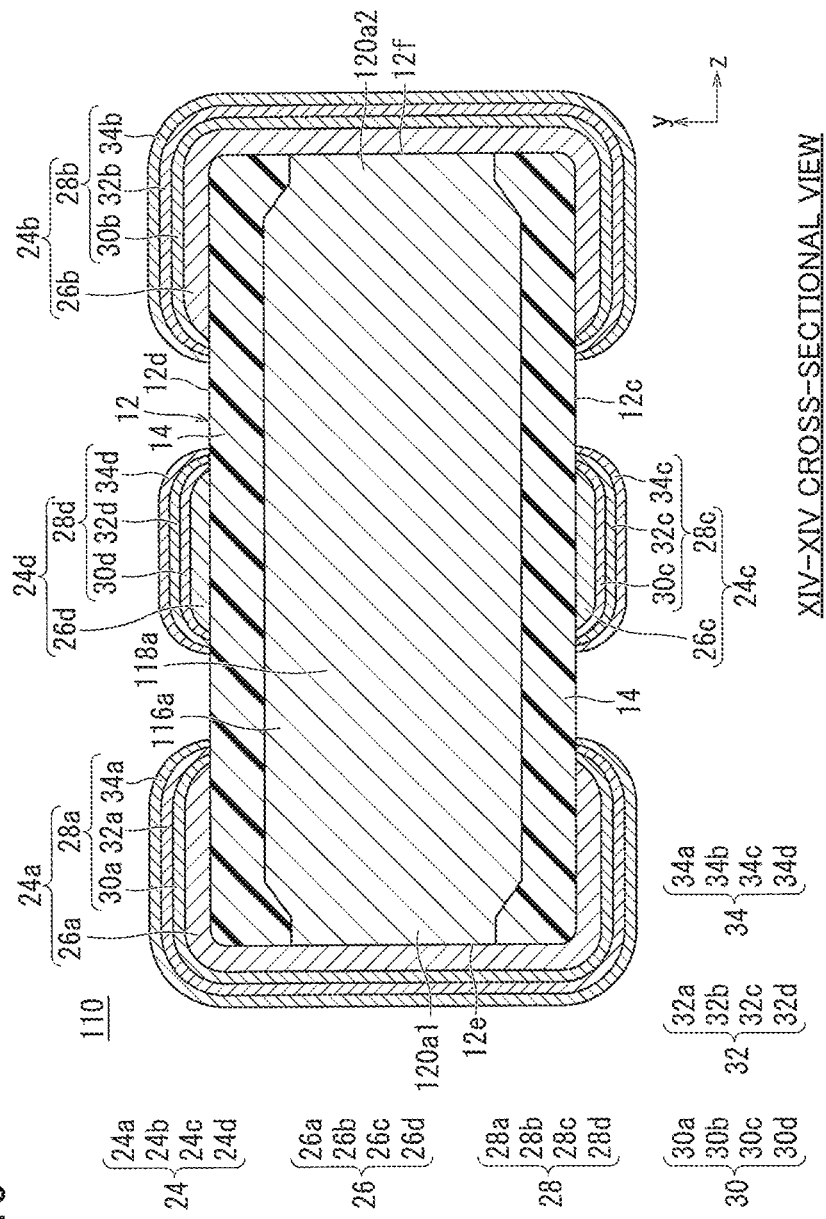
FIG. 16 shows a modification of a first internal electrode layer shown in FIG. 14.

A multilayer ceramic capacitor (three-terminal multilayer ceramic capacitor) will be described as an example of the multilayer ceramic electronic component according to the second preferred embodiment of the present invention. FIG. 8 is an external perspective view showing one example of the multilayer ceramic capacitor (three-terminal multilayer ceramic capacitor) according to the second preferred embodiment of the present invention. FIG. 9 is a top view showing one example of the multilayer ceramic capacitor (three-terminal multilayer ceramic capacitor) according to the second preferred embodiment of the present invention. FIG. 10 is a side view showing one example of the multilayer ceramic capacitor (three-terminal multilayer ceramic capacitor) according to the second preferred embodiment of the present invention. FIG. 11 is a cross-sectional view taken along line XI-XI in FIG. 8. FIG. 12A is a partial enlarged cross-sectional view of a c portion shown in FIG. 11, and FIG. 12B is a partial enlarged cross-sectional view of a d portion shown in FIG. 11. FIG. 13A is a cross-sectional view taken along line XIII-XIII in FIG. 8, FIG. 13B is a partial enlarged cross-sectional view of an e portion shown in FIG. 13A, and FIG. 13C is a partial enlarged cross-sectional view of an f portion shown in FIG. 13A. FIG. 14 is a cross-sectional view taken along line XIV-XIV in FIG. 11. FIG. 15 is a cross-sectional view taken along line XV-XV in FIG. 11. FIG. 16 shows a modification of a first internal electrode layer shown in FIG. 14.

As shown in FIGS. 8 to 13C, a multilayer ceramic capacitor 110 includes multilayer body 12 having a rectangular or substantially rectangular parallelepiped shape, for example.

Multilayer body 12 includes a plurality of stacked ceramic layers 14 and a plurality of internal electrode layers 116. Multilayer body 12 further includes first main surface 12a and second main surface 12b that face each other in height direction x, first side surface 12c and second side surface 12d that face each other in width direction y orthogonal or substantially orthogonal to height direction x, and first end surface 12e and second end surface 12f that face each other in length direction z orthogonal or substantially orthogonal to height direction x and width direction y. A corner portion and a ridge portion of multilayer body 12 are rounded. The corner portion refers to a portion where adjacent three planes of the multilayer body intersect, and the ridge portion refers to a portion where adjacent two planes of the multilayer body intersect. In addition, a portion or all of first main surface 12a and second main surface 12b, first side surface 12c and second side surface 12d, and first end surface 12e and second end surface 12f may be provided with projections and recesses, or the like, for example. Furthermore, a dimension of multilayer body 12 in length direction z is not necessarily longer than a dimension of multilayer body 12 in width direction y.

In the stacking direction that connects first main surface 12a and second main surface 12b, multilayer body 12 includes effective layer portion 15a where internal electrode layers 116 face each other, first outer layer portion 15b located between one of internal electrode layers 116 that is closest to first main surface 12a and first main surface 12a, and second outer layer portion 15c located between one of internal electrode layers 116 that is closest to second main surface 12b and second main surface 12b.

First outer layer portion 15b includes a plurality of ceramic layers 14 located on the first main surface 12a side of multilayer body 12 and located between first main surface 12a and one of internal electrode layers 116 that is closest to first main surface 12a.

Second outer layer portion 15c includes a plurality of ceramic layers 14 located on the second main surface 12b side of multilayer body 12 and located between second main surface 12b and one of internal electrode layers 116 that is closest to second main surface 12b.

A region sandwiched between first outer layer portion 15b and second outer layer portion 15c corresponds to effective layer portion 15a.

Since ceramic layer 14 is made of the same or substantially the same material as that of multilayer ceramic capacitor 10, description thereof will not be repeated.

In addition, since an average thickness of fired ceramic layers 14 in the stacking direction is the same or substantially the same as that of multilayer ceramic capacitor 10, description thereof will not be repeated.

Multilayer body 12 includes, as the plurality of internal electrode layers 116, a plurality of first internal electrode layers 116a and a plurality of second internal electrode layers 116b. The plurality of first internal electrode layers 116a and the plurality of second internal electrode layers 116b are embedded to be alternately arranged and equally or substantially equally spaced along the stacking direction of multilayer body 12.

As shown in FIG. 14, each first internal electrode layer 116a includes a first facing electrode portion 118a that faces second internal electrode layer 116b, one first extending electrode portion 120a1 extending from first facing electrode portion 118a to first end surface 12e of multilayer body 12, and the other first extending electrode portion 120a2 extending from first facing electrode portion 118a to second end surface 12f of multilayer body 12. Specifically, one first extending electrode portion 120a1 is exposed at first end surface 12e of multilayer body 12, and the other first extending electrode portion 120a2 is exposed at second end surface 12f of multilayer body 12. Therefore, first internal electrode layer 116a is not exposed at first side surface 12c and second side surface 12d of multilayer body 12.

As shown in FIG. 15, each second internal electrode layer 116b has a substantially cross shape and includes a second facing electrode portion 118b that faces first internal electrode layer 116a, one second extending electrode portion 120b1 extending from second facing electrode portion 118b to first side surface 12c of multilayer body 12, and the other second extending electrode portion 120b2 extending from second facing electrode portion 118b to second side surface 12d of multilayer body 12. Specifically, one second extending electrode portion 120b1 is exposed at first side surface 12c of multilayer body 12, and the other second extending electrode portion 120b2 is exposed at second side surface 12d of multilayer body 12. Therefore, second internal electrode layer 116b is not exposed at first end surface 12e and second end surface 12f of multilayer body 12.

Although four corner portions of second facing electrode portion 118b of second internal electrode layer 116b are not chamfered, the four corner portions may be chamfered.

Thus, overlapping with corners of first facing electrode portion 118a of first internal electrode layer 116a can be suppressed, which makes it possible to reduce or prevent electric field concentration. As a result, a dielectric breakdown of the ceramic capacitor that may be caused by the electric field concentration can be reduced or prevented.

Multilayer body 12 also includes side portion (hereinafter, also referred to as "W gap") 22a of multilayer body 12 between first side surface 12c and one end of first facing electrode portion 118a of first internal electrode layer 116a in width direction y, and between second side surface 12d and the other end of first facing electrode portion 118a in width direction y, and side portion 22a of multilayer body 12 between first side surface 12c and one end of second facing electrode portion 118b of second internal electrode layer 116b in width direction y, and between second side surface 12d and the other end of first facing electrode portion 118a in width direction y. Multilayer body 12 further includes end portion (hereinafter, also referred to as "L gap") 22b of multilayer body 12 between first end surface 12e and one end of second internal electrode layer 116b in length direction z, and between second end surface 12f and the other end of second internal electrode layer 116b in length direction z.

As shown in FIG. 16, first internal electrode layer 116a may be configured such that a width of one first extending electrode portion 120a1 of first internal electrode layer 116a extending to the first end surface 12e side becomes narrower toward the first end surface 12e side, and a width of the other first extending electrode portion 120a2 of first internal electrode layer 116a extending to second end surface 12f becomes narrower toward the second end surface 12f side (tapered shape). It is preferable that even when the widths are made narrower, an area of a surface where first facing electrode portion 118a of first internal electrode layer 116a and second facing electrode portion 118b of second internal electrode layer 116b face each other remains the same or substantially the same as that before the widths are made narrower.

External electrode 24 is provided on the first end surface 12e side and the second end surface 12f side and on the first side surface 12c side and the second side surface 12d side of multilayer body 12. External electrode 24 includes first external electrode 24a, second external electrode 24b, a third external electrode 24c, and a fourth external electrode 24d.

First external electrode 24a is provided on first end surface 12e of multilayer body 12. First external electrode 24a extends from first end surface 12e of multilayer body 12 to partially cover first main surface 12a, second main surface 12b, first side surface 12c, and second side surface 12d. In addition, first external electrode 24a is electrically connected to one first extending electrode portion 120a1 of first internal electrode layer 116a exposed at first end surface 12e of multilayer body 12.

Second external electrode 24b is provided on second end surface 12f of multilayer body 12. Second external electrode 24b extends from second end surface 12f of multilayer body 12 to partially cover first main surface 12a, second main surface 12b, first side surface 12c, and second side surface 12d. In addition, second external electrode 24b is electrically connected to the other first extending electrode portion 120a2 of first internal electrode layer 116a exposed at second end surface 12f of multilayer body 12.

Third external electrode 24c is provided on first side surface 12c of multilayer body 12. Third external electrode 24c extends from first side surface 12c to partially cover first main surface 12a and second main surface 12b. Third external electrode 24c is electrically connected to one second extending electrode portion 120b1 of second internal electrode layer 116b exposed at first side surface 12c of multilayer body 12.

Fourth external electrode 24d is provided on second side surface 12d of multilayer body 12. Fourth external electrode 24d extends from second side surface 12d to partially cover first main surface 12a and second main surface 12b. Fourth external electrode 24d is electrically connected to the other second extending electrode portion 120b2 of second internal electrode layer 116b exposed at second side surface 12d of multilayer body 12.

In multilayer body 12, first facing electrode portion 118a of first internal electrode layer 116a and second facing electrode portion 118b of second internal electrode layer 116b face each other with ceramic layer 14 being interposed therebetween, to generate a capacitance. Therefore, the capacitance can be obtained between first and second external electrodes 24a and 24b to which first internal electrode layer 116a is connected and third and fourth external electrodes 24c and 24d to which second internal electrode layer 116b is connected, to thus provide the properties of the capacitor.

External electrode 24 includes underlying electrode layer 26 on a surface of multilayer body 12, and plating layer 28 covering underlying electrode layer 26.

Underlying electrode layer 26 includes first underlying electrode layer 26a, second underlying electrode layer 26b, a third underlying electrode layer 26c, and a fourth underlying electrode layer 26d.

First underlying electrode layer 26a is provided on first end surface 12e of multilayer body 12 and extends from first end surface 12e to partially cover first main surface 12a, second main surface 12b, first side surface 12c, and second side surface 12d.

Second underlying electrode layer 26b is provided on second end surface 12f of multilayer body 12 and extends from second end surface 12f to partially cover first main surface 12a, second main surface 12b, first side surface 12c, and second side surface 12d.

First underlying electrode layer 26a may be provided only on first end surface 12e of multilayer body 12, and second underlying electrode layer 26b may be provided only on second end surface 12f of multilayer body 12.

Third underlying electrode layer 26c is provided on first side surface 12c of multilayer body 12 and extends from first side surface 12c to partially cover first main surface 12a and second main surface 12b.

Fourth underlying electrode layer 26d is provided on second side surface 12d of multilayer body 12 and extends from second side surface 12d to partially cover first main surface 12a and second main surface 12b.

Third underlying electrode layer 26c may be provided only on first side surface 12c of multilayer body 12, and fourth underlying electrode layer 26d may be provided only on second side surface 12d of multilayer body 12.

Plating layer 28 includes first plating layer 28a, second plating layer 28b, a third plating layer 28c, and a fourth plating layer 28d.

First plating layer 28a covers first underlying electrode layer 26a.

Second plating layer 28b covers second underlying electrode layer 26b.

Third plating layer 28c covers third underlying electrode layer 26c.

Fourth plating layer 28d covers fourth underlying electrode layer 26d.

Plating layer 28 may include a plurality of layers.

Preferably, plating layer 28 includes lower plating layer 30 that covers underlying electrode layer 26, intermediate plating layer 32 that covers lower plating layer 30, and upper plating layer 34 that covers intermediate plating layer 32.

More specifically, first plating layer 28a includes first lower plating layer 30a that covers first underlying electrode layer 26a, first intermediate plating layer 32a that covers first lower plating layer 30a, and first upper plating layer 34a that covers first intermediate plating layer 32a.

Second plating layer 28b includes second lower plating layer 30b that covers second underlying electrode layer 26b, second intermediate plating layer 32b that covers second lower plating layer 30b, and second upper plating layer 34b that covers second intermediate plating layer 32b.

Third plating layer 28c includes a third lower plating layer 30c that covers third underlying electrode layer 26c, a third intermediate plating layer 32c that covers third lower plating layer 30c, and a third upper plating layer 34c that covers third intermediate plating layer 32c.

Fourth plating layer 28d includes a fourth lower plating layer 30d that covers fourth underlying electrode layer 26d, a fourth intermediate plating layer 32d that covers fourth lower plating layer 30d, and a fourth upper plating layer 34d that covers fourth intermediate plating layer 32d.

A material, a structure and the like of plating layer 28 in multilayer ceramic capacitor 110 are the same or substantially the same as those of multilayer ceramic capacitor 10, and thus, description thereof will not be repeated.

As shown in FIGS. 12A to 13C, in multilayer ceramic capacitor 110 shown in FIG. 8, the metal of lower plating layer 30 diffuses into underlying electrode layer 26 to extend from the surface of underlying electrode layer 26 to interface 42 between multilayer body 12 and underlying electrode layer 26. The metal of lower plating layer 30 is preferably Cu.

That is, as shown in FIG. 12A, the metal of first lower plating layer 30a exists at interface 42a where metal components 38 included in first underlying electrode layer 26a are in contact with each other, interface 42b where metal component 38 included in first underlying electrode layer 26a and ceramic component (co-material) 40 included in first underlying electrode layer 26a are in contact with each other, and interface 42c between metal component 38 included in first underlying electrode layer 26a and multilayer body 12.

Similarly, as shown in FIG. 12B, the metal of second lower plating layer 30b exists at interface 42a where metal components 38 included in second underlying electrode layer 26b are in contact with each other, interface 42b where metal component 38 included in second underlying electrode layer 26b and ceramic component (co-material) 40 included in second underlying electrode layer 26b are in contact with each other, and interface 42c between metal component 38 included in second underlying electrode layer 26b and multilayer body 12.

As shown in FIG. 13B, the metal of third lower plating layer 30c exists at interface 42a where metal components 38 included in third underlying electrode layer 26c are in contact with each other, interface 42b where metal component 38 included in third underlying electrode layer 26c and ceramic component (co-material) 40 included in third underlying electrode layer 26c are in contact with each other, and interface 42c between metal component 38 included in third underlying electrode layer 26c and multilayer body 12.

Similarly, as shown in FIG. 13C, the metal of fourth lower plating layer 30d exists at interface 42a where metal components 38 included in fourth underlying electrode layer 26d are in contact with each other, interface 42b where metal component 38 included in fourth underlying electrode layer 26d and ceramic component (co-material) 40 included in fourth underlying electrode layer 26d are in contact with each other, and interface 42c between metal component 38 included in fourth underlying electrode layer 26d and multilayer body 12.

Therefore, the metal of lower plating layer 30 fills gaps at respective interfaces 42 described above, and thus, entry of moisture into multilayer body 12 from outside can be reduced or prevented. Accordingly, the moisture resistance reliability of multilayer ceramic capacitor 110 can be improved.

Multilayer ceramic capacitor 110 produces advantageous effects similar to that of multilayer ceramic capacitor 10 described above.

2. Method for Manufacturing Multilayer Ceramic Capacitor

Next, a non-limiting example of a method for manufacturing a multilayer ceramic capacitor as an example of a multilayer ceramic electronic component will be described. A non-limiting example of a method for manufacturing the multilayer ceramic capacitor according to the first preferred embodiment will now be described.

First, a ceramic paste including a ceramic powder is applied in a sheet shape by, for example, screen printing or the like, and then dried, to produce a ceramic green sheet.

Then, an electrically conductive paste for internal electrode formation is prepared and applied onto the ceramic green sheet in a prescribed pattern by, for example, screen printing, gravure printing or the like, to prepare a ceramic green sheet on which an electrically conductive pattern for internal electrode formation is formed, and a ceramic green sheet on which the electrically conductive pattern for internal electrode formation is not formed.

The ceramic paste and the electrically conductive paste for internal electrode formation may include, for example, a known organic binder and a known organic solvent. The electrically conductive paste for internal electrode formation is produced, for example, by adding an organic binder and an organic solvent to a metal powder.

Then, the prescribed number of ceramic green sheets for outer layers on which the electrically conductive pattern for internal electrode formation is not formed are stacked. On these ceramic green sheets, ceramic green sheets on which the electrically conductive pattern for internal electrode formation is formed are sequentially stacked, and further, the prescribed number of ceramic green sheets on which the electrically conductive pattern for internal electrode formation is not formed are stacked. A mother multilayer body is thus produced. At this time, a plurality of ceramic green sheets on which the electrically conductive pattern for internal electrode formation is printed are stacked such that extending portions of the electrically conductive pattern for internal electrode formation are staggered. A multilayer sheet is thus produced.

Then, the multilayer sheet is press-fitted in the stacking direction by, for example, isostatic pressing or the like, to produce a multilayer block.

Then, the multilayer block is cut into a prescribed shape dimension, and thus, a raw multilayer body chip is cut out. At this time, a corner portion and a ridge portion of the multilayer body chip may be rounded by, for example, barrel polishing or the like.

Then, underlying electrode layer 26 is formed. First, an electrically conductive paste for external electrode including a metal component, a ceramic component, a solvent, a dispersant and the like is applied onto opposing end surfaces of the raw multilayer body chip by, for example, dipping, screen printing or the like. The metal component includes, for example, at least one selected from Cu, Ni, Ag, Pd, an Ag—Pd alloy, Au and the like. As the ceramic component, a ceramic material of the same or substantially the same type as that of ceramic layer 14 may be used, or a ceramic material of a type different from that of ceramic layer 14 may be used. The ceramic material includes, for example, at least one selected from $BaTiO_3$, $(Ba, Ca)TiO_3$, $SrTiO_3$, $CaZrO_3$ and the like. The electrically conductive paste for external electrode may further include a glass component. The glass component includes at least one selected from B, Si, Ba, Mg, Al, Li and the like.

Assuming that the metal component, Ni is 100 mol, a content of the ceramic material can preferably be adjusted to be, for example, equal to or more than about 5% and equal to or less than about 50% with respect to the overall volume of underlying electrode layer 26.

Then, the raw multilayer body chip and the electrically conductive paste for external electrode applied onto the raw multilayer body chip are simultaneously baked, to produce a multilayer body having a baked layer formed as the underlying electrode layer. A firing temperature at this time is preferably equal to or higher than about 900° C. and equal to or lower than about 1400° C., for example, depending on the ceramic material and a material of the internal electrode.

Then, plating layer 28 is formed on a surface of the underlying electrode layer. In the multilayer ceramic capacitor shown in FIG. 1, the Cu plating layer is formed as the lower plating layer, the Ni plating layer is formed as the intermediate plating layer, and the Sn plating layer is formed as the upper plating layer.

In the step of forming plating layer 28, the Cu plating layer that is lower plating layer 30 is formed, and then, heat treatment is performed. The heat treatment is preferably performed under the conditions of the temperature of, for example, equal to or higher than about 450° C. and equal to or lower than about 650° C., the time period of several minutes to several tens of minutes, and the oxygen concentration atmosphere of several ppm to several hundred ppm. The heat treatment makes it possible to produce a configuration in which the metal of the Cu plating layer exists at interface 42a where the metal components included in the underlying electrode layer are in contact with each other, interface 42b where the metal component included in the underlying electrode layer and the ceramic component (co-material) included in the underlying electrode layer are in contact with each other, and interface 42c between the metal component included in the underlying electrode layer and the multilayer body.

As described above, multilayer ceramic capacitor 10 shown in FIG. 1 is manufactured.

3. Experimental Example

Next, in order to check advantageous effects of the multilayer ceramic capacitor according to preferred embodiments of the present invention described above, a multilayer ceramic capacitor was manufactured and subjected to a moisture resistance reliability test.

(1) Specifications of Sample in Example

First, a multilayer ceramic capacitor according to Example having the following specifications was produced in accordance with the above-described method for manufacturing the multilayer ceramic capacitor.

Example

Structure of multilayer ceramic capacitor: two-terminal (see FIG. 1)
Dimension LXWXT of multilayer ceramic capacitor (including a design value): about 1.0 mm×about 0.5 mm×about 0.5 mm
Material of dielectric layer: $BaTiO_3$
Capacitance: about 22 μF
Rated voltage: about 4V
Structure of internal electrode metal component: Ni
Structure of external electrode underlying electrode layer metal component: Ni
material of ceramic component (co-material) in underlying electrode layer: $BaTiO_3$
content of material of ceramic component (co-material) in underlying electrode layer: about 10%
plating layer: three-layer structure of Cu plating layer, Ni plating layer and Sn plating layer
thickness of Cu plating layer: about 6 μm
thickness of Ni plating layer: about 4 μm
thickness of Sn plating layer: about 4 μm (2) Specifications of Sample in Comparative Example Next, a multilayer ceramic capacitor according to Comparative Example having the following specifications was produced.

Comparative Example

The multilayer ceramic capacitor according to Comparative Example was the same or substantially the same as the multilayer ceramic capacitor according to Example, except that the metal of the Cu plating layer (lower plating layer) did not exist at the interface where the metal components included in the underlying electrode layer were in contact with each other, the interface where the metal component included in the underlying electrode layer and the ceramic component (co-material) included in the underlying electrode layer were in contact with each other, and the interface between the metal component included in the underlying electrode layer and the multilayer body. That is, heat treatment was not performed after the Cu plating layer was formed. The details of the specifications are shown below.

Structure of multilayer ceramic capacitor: two-terminal
Dimension LXWXT of multilayer ceramic capacitor (including a design value): about 1.0 mm×about 0.5 mm×about 0.5 mm
Material of dielectric layer: $BaTiO_3$
Capacitance: about 22 μF
Rated voltage: about 4V
Structure of internal electrode metal component: Ni
Structure of external electrode underlying electrode layer metal component: Ni
material of ceramic component (co-material) in underlying electrode layer: $BaTiO_3$
content of material of ceramic component (co-material) in underlying electrode layer: about 10%
plating layer: three-layer structure of Cu plating layer, Ni plating layer and Sn plating layer
thickness of Cu plating layer: about 6 μm
thickness of Ni plating layer: about 4 μm
thickness of Sn plating layer: about 4 μm (3) Method for Moisture Resistance Reliability Test Ten samples according to Example and ten samples according to Comparative Example were each mounted on a glass epoxy substrate using eutectic solder. Then, an insulation resistance value of each sample was measured. Then, the glass epoxy substrate was put into a high-temperature and high-humidity bath and a voltage of about 3.2 V was applied to each sample for about 72 hours under the environment of about 125° C. and a relative humidity of about 95% RH. Then, an insulation resistance value of each sample after the moisture resistance reliability test was measured.

For each sample, the insulation resistance values before and after the moisture resistance reliability test were compared and a sample showing a decrease in insulation resistance value by one or more orders of magnitude was evaluated as a defective and counted.

The evaluation results are shown in Table 1.

TABLE 1

|  | Number of defectives in moisture resistance reliability test (pieces) |
|---|---|
| Example | 0/10 |
| Comparative Example | 8/10 |

(4) Experimental Results

According to Table 1, in the multilayer ceramic capacitor that was each sample according to Example, the metal of the Cu plating layer (lower plating layer) existed at the interface where the metal components included in the underlying electrode layer were in contact with each other, the interface where the metal component included in the underlying electrode layer and the ceramic component (co-material) included in the underlying electrode layer were in contact with each other, and the interface between the metal component included in the underlying electrode layer and the multilayer body. Therefore, the metal of the Cu plating layer filled gaps at the respective interfaces, and thus, entry of moisture from outside could be reduced or prevented. Thus, as a result of the moisture resistance reliability test, no sample out of the ten samples was evaluated as a defective.

In contrast, in the multilayer ceramic capacitor that was each sample according to Comparative Example, the metal of the Cu plating layer (lower plating layer) did not exist at the interface where the metal components included in the underlying electrode layer were in contact with each other, the interface where the metal component included in the underlying electrode layer and the ceramic component (co-material) included in the underlying electrode layer were in contact with each other, and the interface between the metal component included in the underlying electrode layer and the multilayer body, and there were gaps at these interfaces, and thus, entry of moisture from outside could not be reduced or prevented. Thus, as a result of the moisture resistance reliability test, eight samples out of the ten samples were evaluated as defectives.

It became clear from the foregoing that since the metal of the Cu plating layer (lower plating layer) existed at the interface where the metal components included in the underlying electrode layer were in contact with each other, the interface where the metal component included in the underlying electrode layer and the ceramic component (co-material) included in the underlying electrode layer were in contact with each other, and the interface between the metal component included in the underlying electrode layer and the multilayer body, and thus, the metal of the Cu plating layer filled the gaps at the respective interfaces, entry of moisture from outside could be reduced or prevented, and as a result, the moisture resistance reliability of the multilayer ceramic capacitor could be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer body including:
a plurality of stacked ceramic layers;
a first main surface and a second main surface that face each other in a height direction;
a first side surface and a second side surface that face each other in a width direction orthogonal or substantially orthogonal to the height direction; and
a first end surface and a second end surface that face each other in a length direction orthogonal or substantially orthogonal to the height direction and the width direction;
a first internal electrode layer on a corresponding one of the plurality of ceramic layers and exposed at the first end surface;
a second internal electrode layer on a corresponding one of the plurality of ceramic layers and exposed at the second end surface;
a first external electrode connected to the first internal electrode layer and provided on the first end surface; and
a second external electrode connected to the second internal electrode layer and provided on the second end surface; wherein
the first external electrode includes:
a first underlying electrode layer on the first end surface of the multilayer body and including metal components and ceramic components; and
a plurality of first plating layers on the first underlying electrode layer;
the second external electrode includes:
a second underlying electrode layer on the second end surface of the multilayer body and including metal components and ceramic components; and
a plurality of second plating layers on the second underlying electrode layer;
a metal of a first plating layer on the first underlying electrode layer, of the plurality of first plating layers, diffuses into the first underlying electrode layer to extend from a surface layer of the first underlying electrode layer to an interface of the multilayer body, and exists at an interface where the metal components included in the first underlying electrode layer are in contact with each other, an interface where the metal component included in the first underlying electrode layer and the ceramic component included in the first underlying electrode layer are in contact with each other, and an interface between the metal component included in the first underlying electrode layer and the multilayer body; and
a metal of a second plating layer on the second underlying electrode layer, of the plurality of second plating layers, diffuses into the second underlying electrode layer to extend from a surface layer of the second underlying electrode layer to an interface of the multilayer body, and exists at an interface where the metal components included in the second underlying electrode layer are in contact with each other, an interface where the metal component included in the second underlying electrode layer and the ceramic component included in the second underlying electrode layer are in contact with each other, and an interface between the metal component included in the second underlying electrode layer and the multilayer body.

2. The multilayer ceramic electronic component according to claim 1, wherein the metal components included in the first underlying electrode layer and the second underlying electrode layer are Ni.

3. The multilayer ceramic electronic component according to claim 1, wherein the metal of the first plating layer on the first underlying electrode layer, of the plurality of first plating layers, and the metal of the second plating layer on the second underlying electrode layer, of the plurality of second plating layers, are Cu.

4. The multilayer ceramic electronic component according to claim 1, wherein a dimension of the multilayer body in the length direction is equal to or more than about 0.2 mm and equal to or less than about 10.0 mm, a dimension of the multilayer body in the width direction is equal to or more than about 0.1 mm and equal to or less than about 10.0 mm, and a dimension of the multilayer body in the height direction is equal to or more than about 0.1 mm and equal to or less than about 5.0 mm.

5. The multilayer ceramic electronic component according to claim 1, wherein the plurality of stacked ceramic layers include at least one of $BaTiO_3$, $CaTiO_3$, $SrTiO_3$, or $CaZrO_3$ as a main component.

6. The multilayer ceramic electronic component according to claim 5, wherein the plurality of stacked ceramic layers further include a Mn compound, a Fe compound, a Cr compound, a Co compound, or a Ni compound as a subcomponent.

7. The multilayer ceramic electronic component according to claim 1, wherein the first and second internal electrode layers include at least one of Ni, Cu, Ag, Pd, or Au, or an alloy including at least one of Ni, Cu, Ag, Pd, or Au.

8. The multilayer ceramic electronic component according to claim 1, wherein a thickness of each of the first and second internal electrode layer is equal to or more than about 0.2 μm and equal to or less than about 2.0 μm.

9. The multilayer ceramic electronic component according to claim 1, wherein the multilayer body includes a plurality of the first internal electrode layers and a plurality of the second internal electrode layers.

10. The multilayer ceramic electronic component according to claim 1, wherein a thickness of a central portion of each of the first and second underlying layers is equal to or more than about 3 μm and equal to or less than about 160 μm.

11. The multilayer ceramic electronic component according to claim 1, wherein the metal components included in the first underlying electrode layer and the second underlying electrode layer are at least one of Cu, Ni, Ag, Pd, an Ag—Pd alloy, or Au.

12. The multilayer ceramic electronic component according to claim 11, wherein the ceramic components of each of the first and second underlying electrode layers further are at least one of $BaTiO_3$, $CaTiO_3$, (Ba, Ca)$TiO_3$, $SrTiO_3$, $CaZrO_3$.

13. The multilayer ceramic electronic component according to claim 1, wherein
the plurality of first plating layers include a first intermediate plating layer on the first plating layer on the first underlying layer, and a first upper plating layer on the first intermediate plating layer; and
the plurality of second plating layers include a second intermediate plating layer on the second plating layer on the second underlying layer, and a second upper plating layer on the second intermediate plating layer.

14. The multilayer ceramic electronic component according to claim 13, wherein each of the first intermediate plating layer, the first upper plating layer, the second intermediate layer, and the second upper plating layer includes at least one of Ni, Sn, Cu, Ag, Pd, an Ag—Pd alloy, or Au.

* * * * *